United States Patent
Chigurupati et al.

(10) Patent No.: US 11,948,150 B1
(45) Date of Patent: Apr. 2, 2024

(54) COMPUTER-BASED SYSTEMS AND/OR COMPUTING DEVICES PROGRAMMED FOR INSTANT ISSUANCE OF A REPLACEMENT PHYSICAL ACCESS INSTRUMENT; AND METHODS OF USE THEREOF

(71) Applicant: Capital One Services, LLC, McLean, VA (US)

(72) Inventors: Srinivasa Chigurupati, Long Grove, IL (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/971,004

(22) Filed: Oct. 21, 2022

(51) Int. Cl.
*G06Q 20/40* (2012.01)

(52) U.S. Cl.
CPC .............................. *G06Q 20/4012* (2013.01)

(58) Field of Classification Search
CPC .................................................. G06Q 20/4012
USPC ...................................................... 705/35–45
See application file for complete search history.

(56) References Cited

U.S. PATENT DOCUMENTS

| | | |
|---|---|---|
| 8,157,164 B1 | 4/2012 | Billman |
| 8,548,926 B2 | 10/2013 | Balistierri et al. |
| 9,881,298 B2 | 1/2018 | Flitcroft et al. |
| 10,424,170 B1 | 9/2019 | Benkreira et al. |
| 2009/0228384 A1* | 9/2009 | Melik-Aslanian ...... G07F 7/025 705/35 |
| 2010/0030677 A1* | 2/2010 | Melik-Aslanian ..... G06Q 20/00 705/35 |
| 2011/0302084 A1* | 12/2011 | Melik-Aslanian ... G06Q 20/354 705/44 |

* cited by examiner

*Primary Examiner* — Robert R Niquette
(74) *Attorney, Agent, or Firm* — Greenberg Traurig, LLP

(57) ABSTRACT

A computer-based method includes receiving an activity data associated with a user; where a first user activity profile of the activity data is associated with: a) a first profile identifier, and b) a first instrument, where the first instrument comprises a first security measure; receiving an authentication request to authenticate an identity of the user; generating a security challenge to identify the user; the security challenge being based on a second user activity profile of the activity data; receiving a security response to the a security challenge from an instrument generation module; the security response comprising a second profile identifier associated with a second instrument; authenticating the user based on the security response; generating a third profile identifier to replace the first profile identifier; instructing the instrument generation module to dispense a third instrument; where the third instrument includes: a) the third profile identifier, and b) a second security measure.

20 Claims, 11 Drawing Sheets

US 11,948,150 B1

COMPUTER-BASED SYSTEMS AND/OR COMPUTING DEVICES PROGRAMMED FOR INSTANT ISSUANCE OF A REPLACEMENT PHYSICAL ACCESS INSTRUMENT; AND METHODS OF USE THEREOF

TECHNICAL FIELD

The present disclosure generally relates to computer-based methods and systems for instantly issuing a replacement physical access instrument. In particular, the present disclosure relates to computer-based methods and systems for instantly issuing a replacement physical access instrument, that is linked to an existing user activity profile, via a physical access instrument generation module.

BACKGROUND

User activity profiles often have physical access instruments associated therewith that allow a user to perform a user activity. These physical access instruments may be easily lost, damaged or stolen. In such cases, the user may request a replacement physical access instrument from an issuing entity.

SUMMARY

In some embodiments, the present disclosure provides an exemplary technically improved computer-based method that includes at least the following steps of receiving, by at least one processor, an activity data associated with a user; where the activity data includes at least two user activity profiles; where a first user activity profile of the at least two user activity profiles is associated with: a) a first profile identifier, and b) a first physical access instrument, where the first physical access instrument includes a first security measure; receiving, by the at least one processor, a user request, via a graphical user interface, to replace the first physical access instrument; receiving, by the at least one processor, in response to the user request to replace the first physical access instrument, an authentication request to authenticate an identity of the user; generating, by the at least one processor, at least one security challenge to identify the user; where in the at least one security challenge is based at least in part on a second user activity profile of the at least two user activity profiles; establishing, by the at least one processor, a communication link with a physical access instrument generation module; utilizing, by the at least one processor, the communication link to instruct the physical access instrument generation module, to display the authentication request to the user; receiving, by the at least one processor, at least one security response to the at least one security challenge from the physical access instrument generation module; where the at least one security response includes a second profile identifier associated with a second physical access instrument; authenticating, by the at least one processor, the user based on the at least one security response; generating, by the at least one processor, a third profile identifier to replace the first profile identifier; updating, by the at least one processor, the activity data to include the third profile identifier; instructing, by the at least one processor, the physical access instrument generation module to generate and dispense a third physical access instrument associated with the first user activity profile; where the third physical access instrument includes: a) the third profile identifier, and b) a second security measure that is different from the first security measure; where the physical access instrument generation module includes a plurality of blank physical access instruments.

In some embodiments, the present disclosure provides an exemplary technically improved computer-based method that includes at least the following steps of receiving, by at least one processor, an activity data associated with a user; where the activity data includes at least two user activity profiles; receiving, by the at least one processor, a user request, via physical access instrument generation module, to access the at least two user activity profiles; receiving, by the at least one processor, in response to the user request to access the at least two user activity profiles, an authentication request to authenticate an identity of the user; generating, by the at least one processor, at least one security challenge to identify the user; where in the at least one security challenge is based at least in part on a first user activity profile of the at least two user activity profiles; establishing, by the at least one processor, a communication link with a mobile device of the user; utilizing, by the at least one processor, the communication link to instruct an application, executed on the mobile device of the user, to display the authentication request to the user; receiving, by the at least one processor, at least one security response to the at least one security challenge from the mobile device; where the at least one security response includes a first profile identifier associated with the first physical access instrument; authenticating, by the at least one processor, the user based on the at least one security response; authorizing, by the at least one processor, user access to the at least two user activity profiles; receiving, by the at least one processor, a user selection of a second user activity profile of the at least two user activity profiles; where the second user activity profile of the at least two user activity profiles is associated with: a) a second profile identifier, and b) a second physical access instrument, where the second physical access instrument includes a first security measure; receiving, by the at least one processor, a user request, via a graphical user interface, to replace the second physical access instrument; generating, by the at least one processor, a third profile identifier to replace the second profile identifier; updating, by the at least one processor, the activity data to include the third profile identifier; instructing, by the at least one processor, a physical access instruments generation module to generate and dispense a third physical access instrument associated with the second user activity profile; where the third physical access instrument includes: a) the third profile identifier, and b) a second security measure that is different from the first security measure; where the physical access instruments generation module includes a plurality of blank physical access instruments.

In some embodiments, the present disclosure provides an exemplary technically improved computer-based system that includes at least the following components of at least one processor configured to execute software instructions, where the software instructions, when executed, cause the at least one processor to perform steps to: receive an activity data associated with a user; where the activity data includes at least two user activity profiles; where a first user activity profile of the at least two user activity profiles is associated with: a) a first profile identifier, and b) a first physical access instrument, where the first physical access instrument includes a first security measure; receive a user request, via a graphical user interface, to replace the first physical access instrument; receive in response to the user request to replace the first physical access instrument, an authentication request to authenticate an identity of the user; generate at least one security challenge to identify the user; where in the at least one security challenge is based at least in part on a second user activity profile of the at least two user activity profiles; establish a communication link with a physical access instrument generation module; utilize the communication link to instruct the physical access instrument generation module to display the authentication request to the user; receive at least one security response to the at least one security challenge from the a physical access instrument generation module; where the at least one security response includes a second profile identifier associated with a second physical access instrument; authenticate the user based on the at least one security response; generate a third profile identifier to replace the first profile identifier; update the activity data to include the third profile identifier; instruct a physical access instrument generation module to generate and dispense a third physical access instrument associated with the first user activity profile; where the third physical access instrument includes: a) the third profile identifier, and b) a second security measure that is different from the first security measure; where the physical access instrument generation module includes a plurality of blank physical access instruments.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Figure 1:
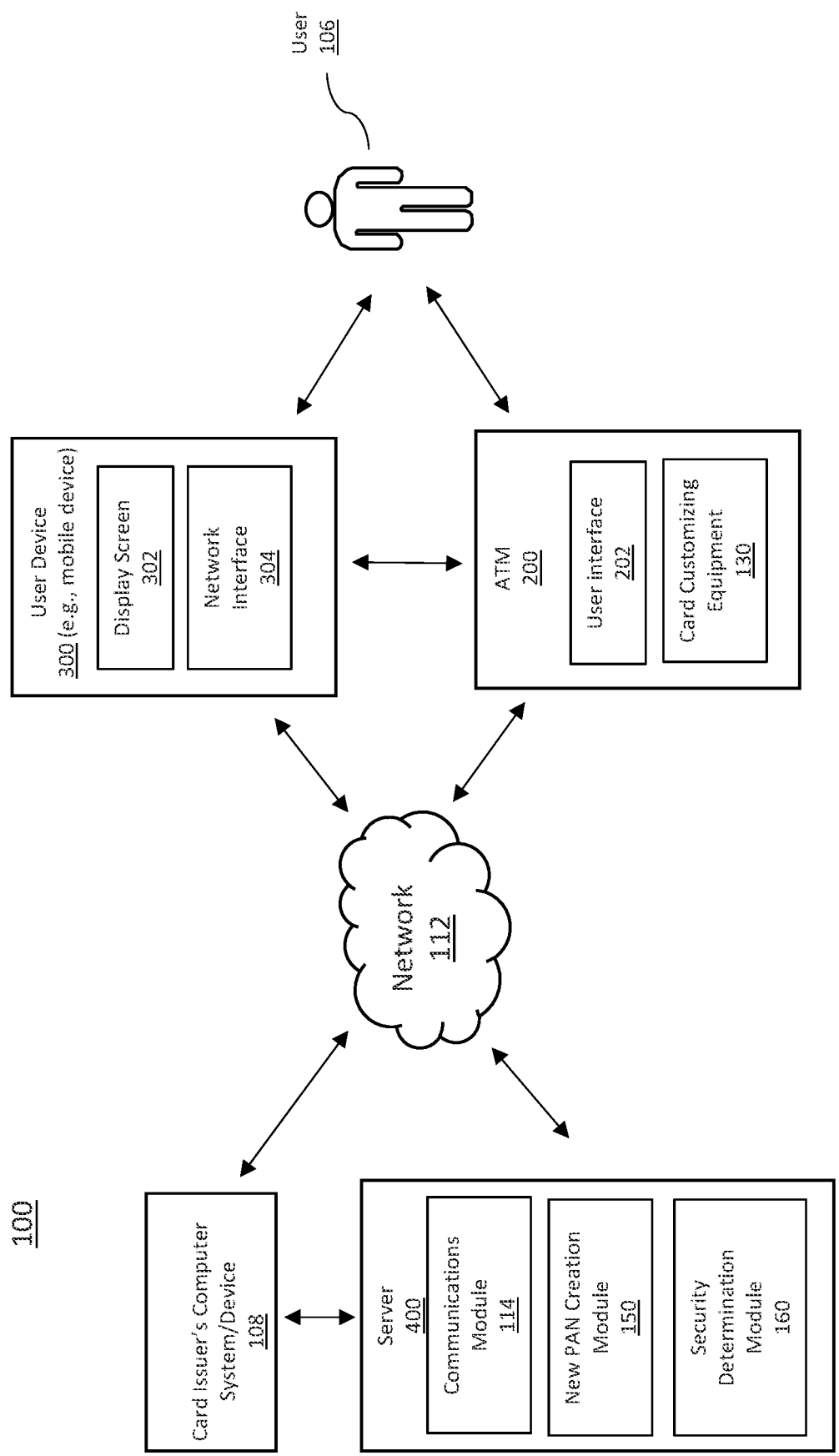
FIG. 1 is a block diagram illustrating an operating computer architecture for instantly requesting and replacing a physical access instrument via a physical access instrument generation module, according to one or more embodiments of the present disclosure.

FIGS. 1 through [11] illustrate systems and methods for instantly issuing a physical access instrument, such as, without limitation, a credit card, via a physical access instruments generation module, such as an Automated Teller Machine ("ATM"), in accordance with at least some embodiments of the present disclosure. The following embodiments provide technical solutions and technical improvements that overcome technical problems, drawbacks and/or deficiencies in at least one technical field involving securely issuing and creating a replacement physical instrument (e.g., credit card) by a vending device, such as, without limitation, an ATM or other automated machine. As explained in more detail below, the present disclosure provides a technically advantageous computer architecture that improves security of user activity profiles (i.e., user activity accounts), such as credit card, debit card or bank accounts, when electrically authorizing the issuance of a replacement credit card, creation of the replacement credit card within an ATM, and dispensation of the replacement credit card to the user. In some embodiments, the system and methods are technologically improved by the ATM including hardware and equipment for creating customized EMV credit cards, within the ATM, that include at least one security measure, such as a cryptogram. In some embodiments, the replacement credit card includes a new PAN and a new BIN that is associated with the original credit card account. In some embodiments, the system and methods improve security of user activity accounts by authorizing the issuance of a new credit card, via the ATM, using a second physical access instrument, associated with the same card issuer as the first physical access instrument, and a dual-factor authentication.

FIG. 1 shows an exemplary system 100 including a physical access instrument generation module, or ATM 200, that is configured to issue a replacement credit card 104. In some embodiments, the system 100 may allow a user 106 to connect to a card issuer's computer system/device 108 through the ATM 200 or a combination of the ATM 200 and a user device 300, by way of a network 112. In some embodiments, the system 100 may include a communications module 114, a new personal account number (PAN) creation module 150, and a security measure determination module 160. In some embodiments, the user 106 may interact with the card issuer's computer system/device 108, which may include a server 400, with respect to requests received through the ATM 200 and the user device 300. In some embodiments, the ATM 200 may be associated with card issuer's computer system/device 108.

In some embodiments, the user device 300 may be one or more computing devices configured to execute software instructions for performing one or more operations consistent with the disclosed embodiments. In some embodiments, the user device 300 may be a mobile device (e.g. tablet, smartphone, etc.), a desktop computer, a laptop, a server, a wearable device (eyeglasses, a watch, etc.), and/or dedicated hardware device. In some embodiments, the user device 300 may include one or more processors configured to execute software instructions stored in memory, such as memory included in user device 300. In some embodiments, the user device 300 may include software that, when executed by a processor, performs known Internet-related communication and content display processes. For instance, in some embodiments, the user device 300 may execute browser software that generates and displays interface screens including content on a display device included in, or connected to, the user device 300. The disclosed embodiments are not limited to any particular configuration of the user device 300. For instance, the user device 300 may be a mobile device that stores and executes mobile applications that provide financial-service-related functions offered by a financial service provider, such as an application associated with one or more user activity profiles that a user holds with a financial service provider.

In some embodiments, the card issuer's computer system/device 108 may be a bank, credit union, credit card issuer, or other type of financial service entity that generates, provides, manages, and/or maintains financial service accounts for one or more users. In some embodiments, financial service accounts may include, for example, credit card accounts, checking accounts, and any other types of financial service accounts known to those skilled in the art. In some embodiments, financial service accounts may be associated with electronic accounts, such as a digital wallet or similar account that may be used to perform electronic transactions, such as purchasing goods and/or services online or in stores. In some embodiments, financial service accounts may also be associated with physical account cards, such as a credit card that user 106 may carry on their person and use to perform transactions, such as purchasing goods and/or services at a point-of-sale terminal.

In some embodiments, the card issuer's computer system/device 108 includes infrastructure and components that are configured to generate and provide financial service accounts and financial service account cards (e.g., debit cards, credit cards). In some embodiments, the card issuer's computer system/device 108 may also include infrastructure and components that are configured to manage transactions associated with a customer service account. In certain aspects, the card issuer's computer system/device 108 may provide a primary financial service to the user 106. For example, in some embodiments, the card issuer's computer system/device 108 may maintain a credit card account with the user 106. In addition to the primary service (e.g., credit card account), in some embodiments, the card issuer's computer system/device 108 may also provide additional services to user 106 to provide fast in-store purchases. These additional services may include, for example, receiving a transmitted notification, for example through the network 112, of a request to replace a lost/damaged/missing credit card. In some embodiments, the card issuer's computer system/device 108 includes the server 400.

The network 112 may be any type of network configured to provide communications between components of the system 100. For example, the network 112 may be any type of network (including infrastructure) that provides communications, exchanges information, and/or facilitates the exchange of information, such as the Internet, a Local Area Network, near field communication (NFC), Bluetooth®, Wifi, or other suitable connection(s) that enables the sending and receiving of information between the components of the system 100. In other embodiments, one or more components of the system 100 may communicate directly through a dedicated communication link(s) (not shown), such as a link between the user device 300 and the ATM 200.

FIG. 1 depicts an exemplary ATM 200. In some embodiments, the ATM 200 includes at least one processor configured to execute instructions, and at least one memory. In some embodiments, the memory further includes at least one program containing instructions and data. In some embodiments, the ATM 200 also includes a user interface 202. In some embodiments, the ATM 200 also includes card customizing equipment 204.

In some embodiments, the at least one processor may include one or more known processing devices, such as a microprocessor from the Core™, Pentium™ or Xeon™ family manufactured by Intel™, the Turion™ family manufactured by AMD™, or the "Ax" or "Sx" family manufactured by Apple™ for example. The disclosed embodiments are not limited to any type of processor(s) otherwise configured to meet the computing demands of different components of the ATM 200.

In some embodiments, the memory may be, for example, a magnetic, semiconductor, tape, optical, removable, non-removable, or other type of storage device or tangible (e.g., non-transitory) computer readable medium. In some embodiments, the memory may store the operating system, as well as data and mobile applications for performing operations consistent with functions described below.

In some embodiments, the operating system may perform known operating system functions when executed by the processor(s). By way of example, the operating system may include Android™, Apple OS X™, Unix™, Linux™, or others.

In some embodiments, the user interface 202 may include, for example, interface components such as a graphical user interface or display screen. In some embodiments, a display screen may include, for example, a liquid crystal display (LCD), a light emitting diode screen (LED), an organic light emitting diode screen (OLED), a touch screen, or other known display screens. In some embodiments, the display screen may display various kinds of information consistent with the disclosed embodiments. In some embodiments, the user interface 202 may also include, for example, interface components such as physical buttons, a microphone, a camera (still or video), or the like. In some embodiments, the user interface 202 may further include equipment for obtaining biometric identification information from the user 106. In some embodiments, such equipment may include a scanner for obtaining one or more fingerprints from the user 106, performing a retinal scan, collecting an audio sample of the voice of the user 106, etc. In some embodiments, the user interface 202 may include equipment suitable for collecting any such biometric information that may be useful for facilitating confirming the identity of the user 106.

In some embodiments, the card customizing equipment 204 may include any device capable of customizing a personal chip bank card. For example, in some embodiments, the card customizing equipment 204 may include a personal chip embosser or laser engraver. In some embodiments, the card customizing equipment 204 may encode the personal chip bank card with a cryptogram. In some embodiments, the card customizing equipment 204 includes a storage of blank cards to be used for creating replacement credit cards.

In some embodiments, integrated circuitry cards (IC cards) and an exemplary vending device (e.g., ATM 200) may interact in accordance one or more interface protocols, including in accordance with a series of standards pertaining to IC cards, such as, without limitation, ISO/IEC 7816 parts I to 10.

FIG. 1 depicts an exemplary user device 300. In some embodiments, the user device 300 may be a mobile device with computing capabilities, such as a tablet, a smartphone, a wearable device, or any combination of these devices and/or affiliated components. As shown, in some embodiments, the user device 300 may include at least one processor, at least one memory storing one or more operating systems. In some embodiments, the user device 300 includes a display screen 302, and a network interface 304.

In some embodiments, the at least one processor may include one or more known processing devices, such as a microprocessor from the Core™, Pentium™ or Xeon™ family manufactured by Intel™, the Turion™ family manufactured by AMD™, or the "Ax" or "Sx" family manufactured by Apple™ for example. The disclosed embodiments are not limited to any type of processor otherwise configured to meet the computing demands of different components of user device 300.

In some embodiments, the display screen 302 may include, for example, a liquid crystal display (LCD), a light emitting diode screen (LED), an organic light emitting diode screen (OLED), a touch screen, or other known display screens. In some embodiments, the display screen 302 may display various kinds of information consistent with the disclosed embodiments.

In some embodiments the network interface 304 may allow the user device 300 to send and receive information through the network 112. Alternatively, or additionally, in some embodiments, the network interface 304 may establish direct wired or wireless connection between the user device 300 and other system components, such as the ATM 200.

In some embodiments, the at least one memory may be, for example, a magnetic, semiconductor, tape, optical, removable, non-removable, or other type of storage device or tangible (e.g., non-transitory) computer readable medium. In some embodiments the at least one memory may store operating system, as well as data and mobile applications for performing operations consistent with functions described below.

In some embodiments, the operating system may perform known operating system functions when executed by the processor(s). By way of example, the operating system may include Android™, Apple OS X™, Unix™, Linux™, or others.

In some embodiments, the server 400 may include one or more processors, one or more memories, and one or more input/output (I/O) devices. According to some embodiments, server 400 may be an embedded system or similar computing device that generates, maintains, and provides web site(s) consistent with disclosed embodiments. In some embodiments, the server 400 may be standalone, or it may be part of a subsystem, which may be part of a larger system. For example, in some embodiments, the server 400 may represent distributed servers that are remotely located and communicate over a network (e.g., network 112) or a dedicated network, such as a LAN. In some embodiments, the server 400 may correspond to the card issuer's computer system/device 108.

In some embodiments, the processor may include one or more known processing devices, such as a microprocessor from the Core™, Pentium™ or Xeon™ family manufactured by Intel™, the Turion™ family manufactured by AMD™, or the "Ax" or "Sx" family manufactured by Apple™, for example. The disclosed embodiments are not limited to any type of processor(s) otherwise configured to meet the computing demands of different components of the server 400.

In some embodiments, the memory may include one or more storage devices configured to store instructions used by the processor to perform functions related to disclosed embodiments. For example, the memory may be configured with one or more software instructions, such as program(s) that may perform one or more operations when executed by the processor. The disclosed embodiments are not limited to separate programs or computers configured to perform dedicated tasks. For example, the memory may include a single program that embodies the functions of the server 400, or the program could include multiple programs. Additionally, in some embodiments, the processor may execute one or more programs located remotely from the server 400. For example, the user device 300, the ATM 200, and/or the card issuer's computer system/device 108, may, via the server 400, access one or more remote programs that, when executed, perform functions related to certain disclosed embodiments. In some embodiments, the memory may also store data that reflects any type of information in any format that the server 400 may use in the system 100 to perform operations consistent with the disclosed embodiments.

In some embodiments, the I/O device may be one or more devices configured to allow data to be received and/or transmitted by server 400. In some embodiments, the I/O devices may include one or more digital and/or analog communication devices that allow the server 400 to communicate with other machines and devices, such as other components of the system 100.

In some embodiments, the server 400 may also be communicatively connected to one or more database(s). In some embodiments, the server 400 may be communicatively connected to the database(s) through the network 112. In some embodiments, the database may include one or more memory devices that store information and are accessed and/or managed through the server 400. By way of example, the database(s) by include Oracle™ databases, Sybase™ database, or other relational databases or non-relational databases, such as Hadoop sequences files, HBase, or Cassandra. The databases or other files may include, for example, data and information related to the source and destination of a network request, the data contained in the request, etc. The systems and methods of the disclosed embodiments, however, are not limited to separate databases. In some embodiments, the server 400 may include the database. Alternatively, in some embodiments, the database may be located remotely from the server 400. In some embodiments, the database may include computing components (e.g., database management system, database server, etc.) configured to receive and process requests for data stored in memory devices of the database(s) and to provide data from the database.

As further described herein, in some embodiments, the server 400 may perform operations (or methods, functions, processes, etc.) that may require access to one or more peripherals and/or modules. In the example of FIG. 1, the server 400 includes the communications module 114, the new PAN creation module 150 and the security determination module 160.

In some embodiments, the communications module 114 may be implemented as an application (or set of instructions) or software/hardware combination configured to perform operations for communicating information between the user 106, the card issuer's computer system/device 108 the ATM 200 and the new PAN creation module 150. In some embodiments, the communications module 114 may include a processor and a memory device. In some embodiments, the memory device may include a database system configured to store data relating to users, card issuers, system generated unique bank identification numbers (BINs) and sub-BINs (discussed in more detail herein), which are created within the BINS (e.g., one for each country currency), and cryptographic key sets corresponding to each system generated BIN. In some embodiments, the communications module 114 is configured to communicate with a plurality of card issuers and a plurality of users, external to the system 100.

In some embodiments, the communications module 114 is configured to receive credit card requests from both card issuer's computer system/devices 108 and users 106, to collect information relating to the user 106, and to create a file including all information collected associated with the user 106. In some embodiments, the collected information relating to the user 106 may include, for example, name, telephone number, etc. For example, the communications module 114 may receive a request from a user 106 for a replacement credit card 104 due to a lost, damaged or stolen credit card and may collect contact information for prompt issuance and creation of a replacement card.

In some embodiments, the communications module 114 is further configured to receive authorization from the card issuer's computer system/device 108 (shown in FIG. 1), to receive new account information from the card issuer's computer system/device 108, and to initiate the creation of a replacement credit card for the user 106. In some embodiments, the new account information may include, for example, a new personal account number (PAN) associated with the credit card account of the user 106, an expiration date, activation information, etc. Further to the example above, in some embodiments, the communications module 114 may communicate with the card issuer's computer system/device 108, informing the card issuer's computer system/device 108 of the user's lost, damaged or stolen credit card, request that new account information be created and shared with the system 100, and request permission to create a replacement credit card on behalf of the card issuer's computer system/device 108.

Furthermore, in some embodiments, the communications module 114 is configured to communicate with the ATM 200, for producing a physical replacement credit card 104 at the time of the request. In some embodiments, the communications module 114 of the system 100 is configured to communicate with each of the user 106, the card issuer's computer system/device 108 and the ATM 200 via the network 112.

In some embodiments, the new PAN creation module 150 is coupled to, and configured to communicate with, both the communications module 114 and the security measure determination module 160. The new PAN creation module 150 is configured to receive, from the communications module 114 information held by the card issuer's computer system/device 108 relating to the user 106. In some embodiments, the new PAN creation module 150 is configured to assign a new PAN 126 to the user 106. In some embodiments, the new PAN 126 is generated by the new PAN creation module 150 specifically for the user 106. In some embodiments, the selection of the new PAN 126 is based on the PAN characteristics of the user 106. In some embodiments, the PAN characteristics may include, for example, card type, product type, country currency, etc., or any suitable combination thereof. In some embodiments, the new PAN 126 may also correspond to one of a plurality of global BINs and/or sub-BINs generated by the system 100.

In some embodiments, the new PAN creation module 150 is further configured to update the user's credit card account to incorporate the new PAN information.

In some embodiments, the security measure determination module 160 is coupled to the new PAN creation module 160. In some embodiments, the security measure determination module 160 (e.g., operations module) is configured to receive, from the new PAN creation module 150, the updated credit card account information, including user information.

In some embodiments, the security measure determination module 160 is configured to determine and to append at least one security measure. In some embodiments, the at least one security measure may be cryptographic keys, algorithms, or the information for generating, for example, a CVV/CVC (card verification value code), a PIN (personal identification number), a EMV chip (standard promulgated jointly by Europay International S.A., MasterCard® International Incorporated, and Visa International Service Association), Magnetic Stripe, etc., or any suitable combination thereof. In some embodiments, the security measure determination module 160 is further configured to determine an appropriate system generated BIN/sub-BIN for the temporary card and any cryptographic keys associated with the security measures and/or selected BINs. In some embodiments, the security measure determination module 160 is further configured to update the user's credit card account to incorporate the security measure information.

Figure 2:
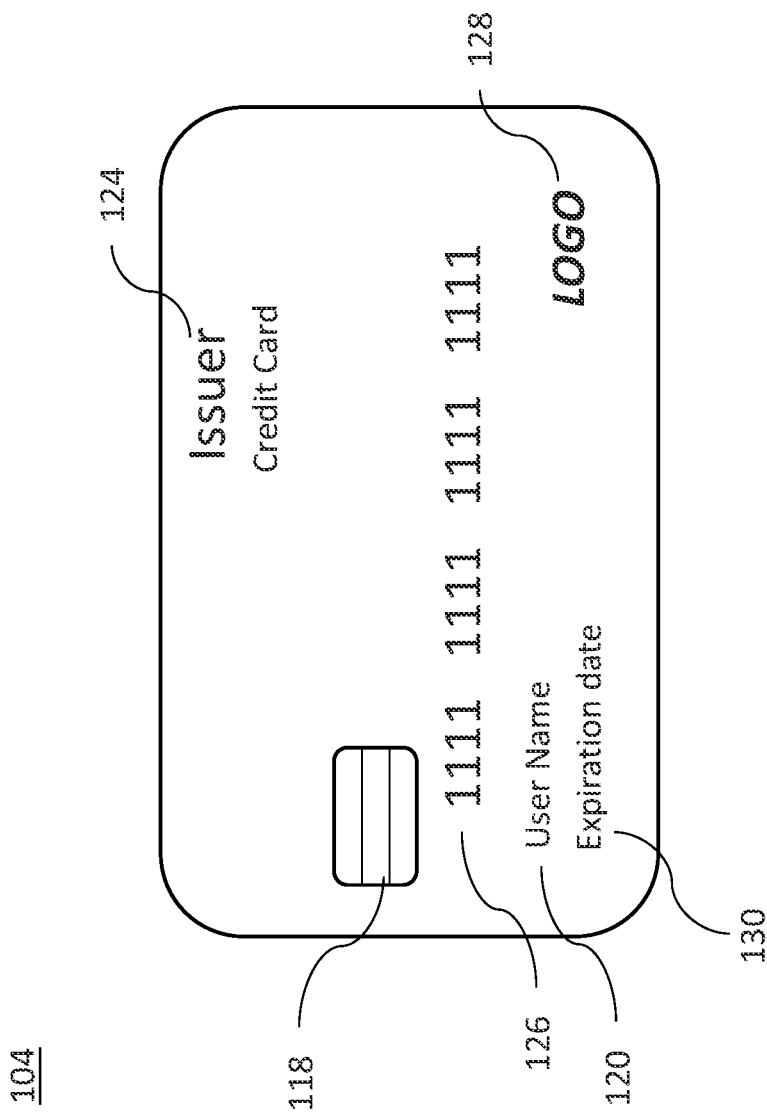
FIG. 2 illustrates an example of a replacement physical access instrument generated by the physical access instrument generation module of the system of FIG. 1, according to one or more embodiments of the present disclosure.

FIG. 2 illustrates an exemplary embodiment of a replacement credit card 104 that may be generated by the system 100 of FIG. 1. The replacement credit card 104, as illustrated in FIG. 2, may include an integrated circuit (IC) chip 118, which includes a microprocessor and memory, and electrical contacts for communicating between the chip 118 and devices external to the replacement credit card 104. In some embodiments, the replacement credit card 104 may include a substrate including a memory storing one or more applets, a counter value, and one or more keys. In some embodiments, the chip 118 may be configured to store a new personal account number (PAN) and PIN (if available) within the memory. In some embodiments, the counter value may be used to generate a unique cryptogram that may be used to authenticate contactless card transactions. In some embodiments, the cryptogram may be used together with the PIN to provide dual factor authentication of contactless card transactions.

In some embodiments, the replacement credit card 104 may include a substrate, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. However, it is understood that the replacement credit card 104 according to the present disclosure may have different characteristics.

In some embodiments, the front side of the replacement credit card 104 is configured to identify the type of card. For example, in some embodiments, "Credit Card" may be identified. In some embodiments, the replacement credit card 104 includes an issuer name 124, the cardholder's new PAN 126, and the logo 128 of financial services (e.g., CapitalOne®) accessed by the replacement credit card 104. Although only one logo is illustrated, any suitable number of logos may appear on the face of the replacement credit card 104. Alternatively, the replacement credit card 104 may appear unbranded. In some embodiments, the replacement credit card 104 may include an expiration date 130. In some embodiments, the replacement credit card 104 may also include identifying information such as the user's name 120. However, in some embodiments, as in the embodiment illustrated in FIG. 2, the front side of the replacement credit card 104 does not necessarily need to illustrate the user's name 120.

Figure 3:
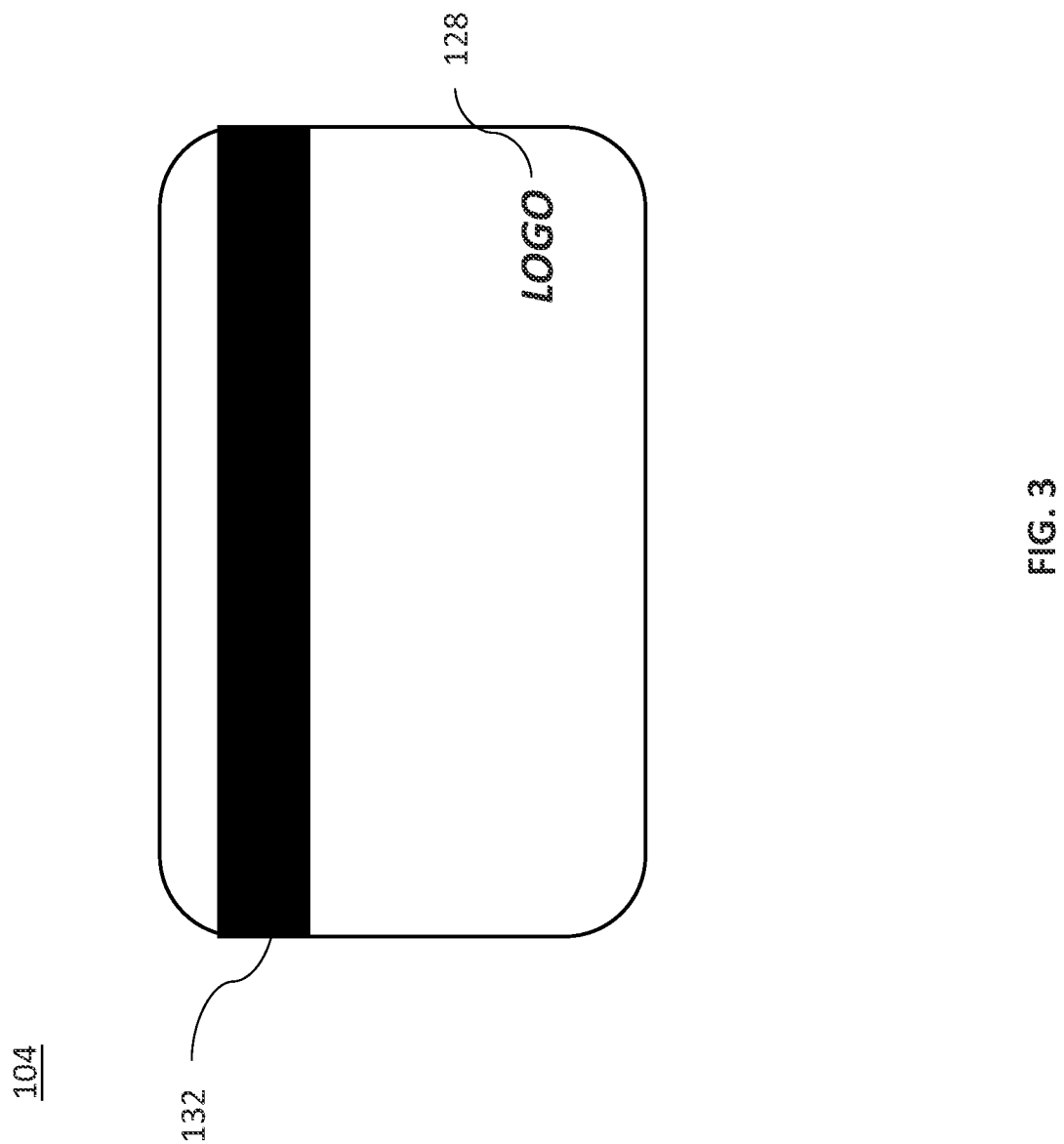
FIG. 3 is a schematic illustration of a replacement physical access instrument generated by the physical access instrument generation module of the system of FIG. 1, according to one or more embodiments of the present disclosure.

FIG. 3 illustrates a back side of the replacement credit card 104 including a magnetic stripe 132, according to some embodiments. In some embodiments, the logo 128 may appear on the back side of the card as well as the front side. In some embodiments, a magnetic stripe 132 may be used in lieu of, or in addition to, the chip 118. In some embodiments, the magnetic stripe 132 is configured to store information including, for example, the PAN 126 and information that, upon swiping the magnetic stripe 132 of the card through a merchant terminal, enables the terminal to connect to a processing center via a modem or some other approved communications method.

Figure 4:
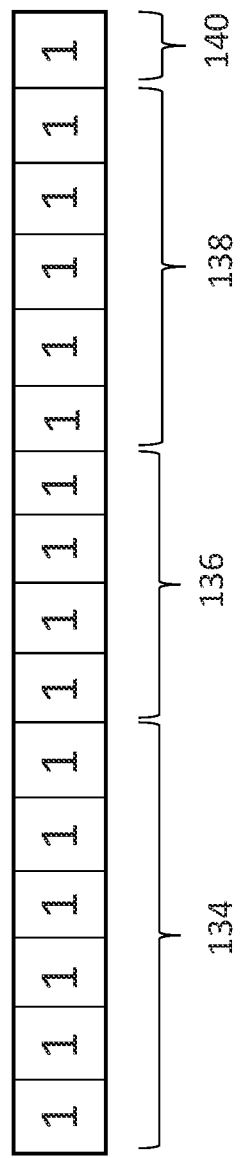
FIG. 4 is a schematic illustration of an exemplary new profile identifier generated by the system of FIG. 1, according to one or more embodiments of the present disclosure.

FIG. 4 illustrates the PAN 126, according to some embodiments, which is stored on the magnetic stripe 132. In some embodiments, the PAN 126 may include 16 to 19 digits in total. In the example illustrated in FIG. 4, the PAN 126 includes a total of 16 digits. In this example, the first six digits 134 may include a system generated "BIN" which identifies the type of card. In this example, the type of card is a "Credit Card", as shown in FIG. 4. In some embodiments, the next four digits 136 may be card issuer ID numbers, which the system 100 generates and assigns to specific card issuers. In some embodiments, the card issuer ID number facilitates in linking the funds associated with the card to the PAN issued by the card issuer and associated with a credit card account of the user 106. In some embodiments, the next five to eight digits 138 may include a number of the credit card account in which the balance associated with the replacement credit card is stored. In some embodiments, the final digit 140 may include a check digit to verify the other 15-18 digits. Of course, the format may be different, this example being just one of many possibilities. In some embodiments the final digit 140 may include up to 3 digits. These digits are commonly referred to as the card's security code (e.g., CVV/CVC).

Figure 5:
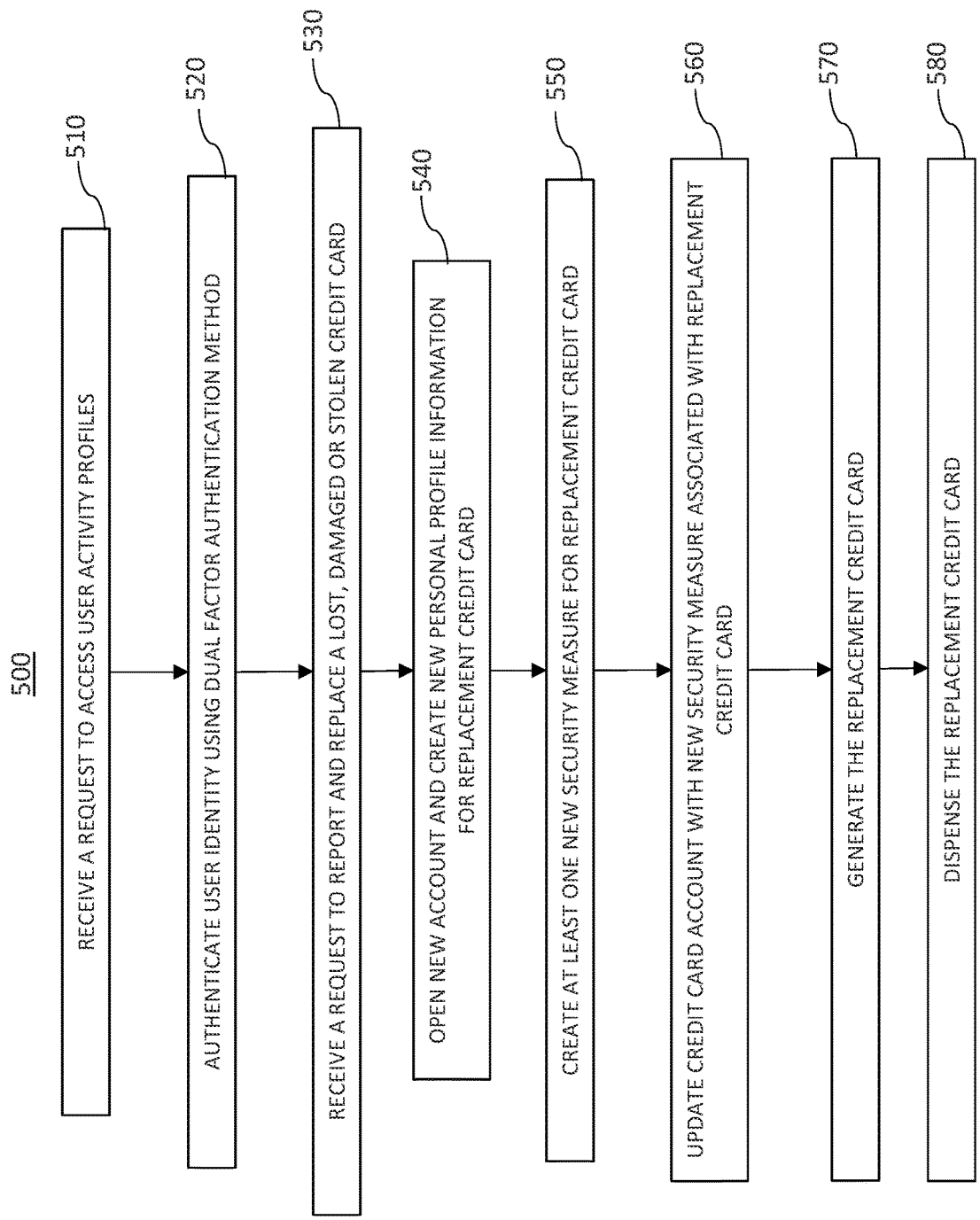
FIG. 5 is a process flow diagram illustrating an example of a computer-based process for requesting and receiving a replacement physical access instrument by interaction with the physical access instrument generation module, according to one or more embodiments of the present disclosure.

FIG. 5 is a process flow diagram illustration of an example of an illustrated computer-mediated process for requesting and receiving a replacement credit card by interaction with the ATM 200, according to one or more embodiments of the present disclosure. The exemplary computer-mediated process 500 may be executed by software, hardware, or a combination thereof. For example, process 500 may be performed by including one or more components described in the system 100 of FIG. 1 (e.g., server 400, user device 300 and ATM 200).

At step 510, the ATM 200 receives a request from the user 106 through the user interface 202 to access his or her user activity profiles (e.g., financial accounts (e.g., credit card account(s), banking account(s), investor account(s), etc., including any combination thereof), library accounts, store accounts, work profiles, etc., including any combination therefore), associated with at least one card issuer computer system/device 108. In some embodiments, the user 106 has at least two user activity accounts associated with the card issuer's computer system/device 108. In some embodiments, the user 106 may request access to his or her user activity accounts by inserting a second physical access instrument 144, held by the user 106 and associated with the same card issuer's computer system/device 108, into the ATM 200. In some embodiments, the second physical access instrument 144 may be a debit card, a credit card, or another financial card. The second physical access instrument 144 may include a physical card or a "virtual card" stored on the user's mobile phone or tablet, e.g., on the user device 300. In some embodiments, introducing the second physical access instrument 144 to the ATM 200 may include inserting a physical card into the ATM 200 or using a contactless method such as, for example, radio frequency identification (RFID) or near-field communication (NFC).

At step 520 the identity of the user 106 is authenticated via the ATM 200. In some embodiments, at least one security challenge is generated to identify and authenticate the user 106. In some embodiments, the identity of the user is authenticated via a dual factor authentication method 600 using a PIN and cryptogram associated with a second physical access instrument 144, as will be described in further detail below with regard to FIG. 6.

Figure 6:
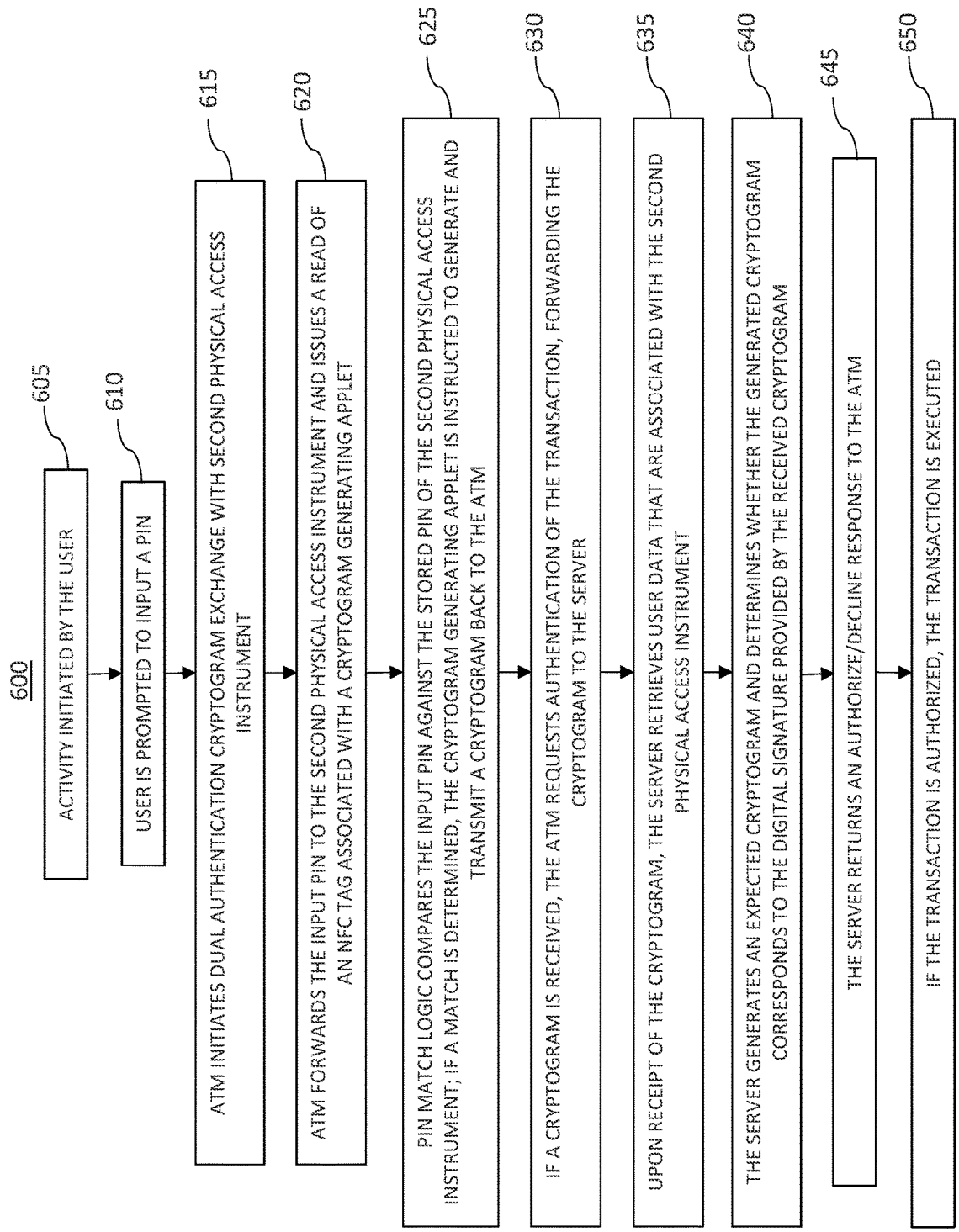
FIG. 6 is a process flow diagram illustrating an example of a computer-based process for dual factor authentication of an identity of a user, according to one or more embodiments of the present disclosure.

FIG. 6 illustrates a method 600 for dual factor authentication using the system 100. At step 605 an activity is initiated by the user 106. For example, in some embodiments, the activity may be the user requesting access to the user's activity profiles.

At step 610, the user 106 may be prompted to input a PIN. Upon receipt of the input PIN, at 615, the ATM 200 may initiate a dual-authentication cryptogram exchange with the second physical access instrument 144. For example, in some embodiments, the ATM 200 may prompt the user to tap the second physical access instrument 144 or user device 300 on the ATM 200 or otherwise bring the second physical access instrument 144 or user device 300 in communication range with the ATM 200.

When the second physical access instrument 144 or user device 300 is within range of the ATM, at step 620 the ATM may forward the input PIN to the second physical access instrument 144, for example as a PIN record, and issues a read of an NFC tag associated with a cryptogram generating applet.

At step 625, PIN match logic may compare the input PIN against the stored PIN of the second physical access instrument 144. In some embodiments, if a 'match' is determined, the cryptogram generating applet is instructed to generate a cryptogram an to transmit the cryptogram back to the ATM.

At step 630, if a cryptogram is not received, for example due to a PIN mismatch, the transaction may be cancelled. If a cryptogram is received at step 635, then the ATM 200 may request authentication of the transaction, forwarding the cryptogram to the server 400.

At step 635, upon receipt of the cryptogram by the server 400, the server 400 may retrieve user data, including counters, keys, shared secrets and the like that are associated with the second physical access instrument 144.

Using this information, at step 640 the server may generate an expected cryptogram and may determine whether the generated cryptogram corresponds to the unique digital signature provided by the received cryptogram.

At step 645, the server may return an authorize/decline response to the ATM 200. In some embodiments, if the ATM 200 determines at step 645 that the transaction is authorized, then the transaction may be executed at step 650. In some embodiments, if the transaction is declined, the transaction device cancels the transaction.

The disclosed dual-factor PIN-based authentication system improves upon transaction security by protecting the stored PIN from discovery. In some embodiments, the stored PIN is not publicly transmitted and thus cannot be obtained by malicious monitoring during a PIN exchange. In the event that a PIN, shared secret and/or counter value may be obtained via skimming, a cloned card without knowledge of the dynamic counter protocol implemented between the card and the authentication server would be inoperable.

In some embodiments, once the identity of the user 106 is authenticated, the user 106 may have access to all of their user activity profiles associated with the card issuer's computer system/device 108. For example, in some embodiments, the user 106 may hold a bank account and two credit card accounts with the card issuer's computer system/device 108. Thus, in some embodiments, introducing the second physical access instrument 144 to the ATM 200 may give the user 106 access to each of the bank account and the two credit card accounts. In some embodiments, the user interface 202 may display each existing user activity profile held by the user 106 and present an option to select one of the user activity profiles.

At step 530, the ATM 200 receives a request from the user 106, through the user interface 202, to report a lost, damaged or stolen credit card associated with one of the user's existing user activity profiles. In some embodiments, the lost, damaged or stolen credit card was associated with a user activity profile (i.e., a credit card account) and included an account identifier (i.e., PAN) and a security measure. Once the credit card is reported as lost, damaged or stolen, the user 106 may be presented with the option to request a replacement credit card 104 be issued by the card issuer's computer system/device 108. In some embodiments, once the user 106 has accessed his or her user activity profiles, the user interface 202 may present an option to select one of the existing credit card accounts and request a replacement credit card through the user interface 202, a button, or any other physical component of the ATM 200.

At step 540, the communications module 114 communicates with the card issuer to inform the issuer that the user 106 has requested a replacement credit card. In some embodiments, the communications module 114 may request that the card issuer's computer system/device 108 open a new account for the user 106. In some embodiments, the communications module 114 may also request authorization to generate a replacement credit card for the user 106 on behalf of the card issuer's computer system/device 108. In some embodiments, once authorization is granted by the card issuer's computer system/device 108, the communications module 114 may receive, from the new PAN creation module 150, the new personal account information including, for example, the new PAN associated with the credit card account of the user 106, expiration date of the new account, activation information, etc. In some embodiments, the system 100 may update the user's credit card account to include the new personal account information.

At step 550, the security measure determination module 160 receives the user's updated information, including the new PAN, from the new PAN creation module 150. In some embodiments, the security measure determination module 160 may determine and append at least one new security measure for the PAN. In some embodiments, the at least one new security measure may be different from the security measure associated with the lost/damaged/stolen credit card. In some embodiments, the security measure may include, for example, a CVV/CVC 1 and CVV/CVC 2, a PIN, an EMV chip, Magnetic Stripe, etc., or any suitable combination thereof. In some embodiments, the security measure determination module 160 may determine an appropriate BIN for the temporary card and any cryptographic keys associated with the security measure and/or selected BIN.

At step 560, the system 100 may update the user's credit card account with the new security measure associated with the replacement credit card 104.

At step 570, the system 100 may instruct the ATM 200 to generate the replacement credit card 104 for dispensation to the user 106. In some embodiments, the system 100 may transmit the user's updated credit card account information to the ATM 200 so that the physical replacement credit card 104 bearing the new PAN, the determined security measures, and information pertaining to the user 106 (e.g., name) may be created by the ATM 200. In some embodiments, the replacement credit card 104 may be personalized by the user 106. For example, in some embodiments, the user 106 may choose a color, design, etc. to be printed onto the replacement credit card 104.

At step 580, the ATM 200 dispenses the replacement credit card 104 to the user 106.

Figure 7:
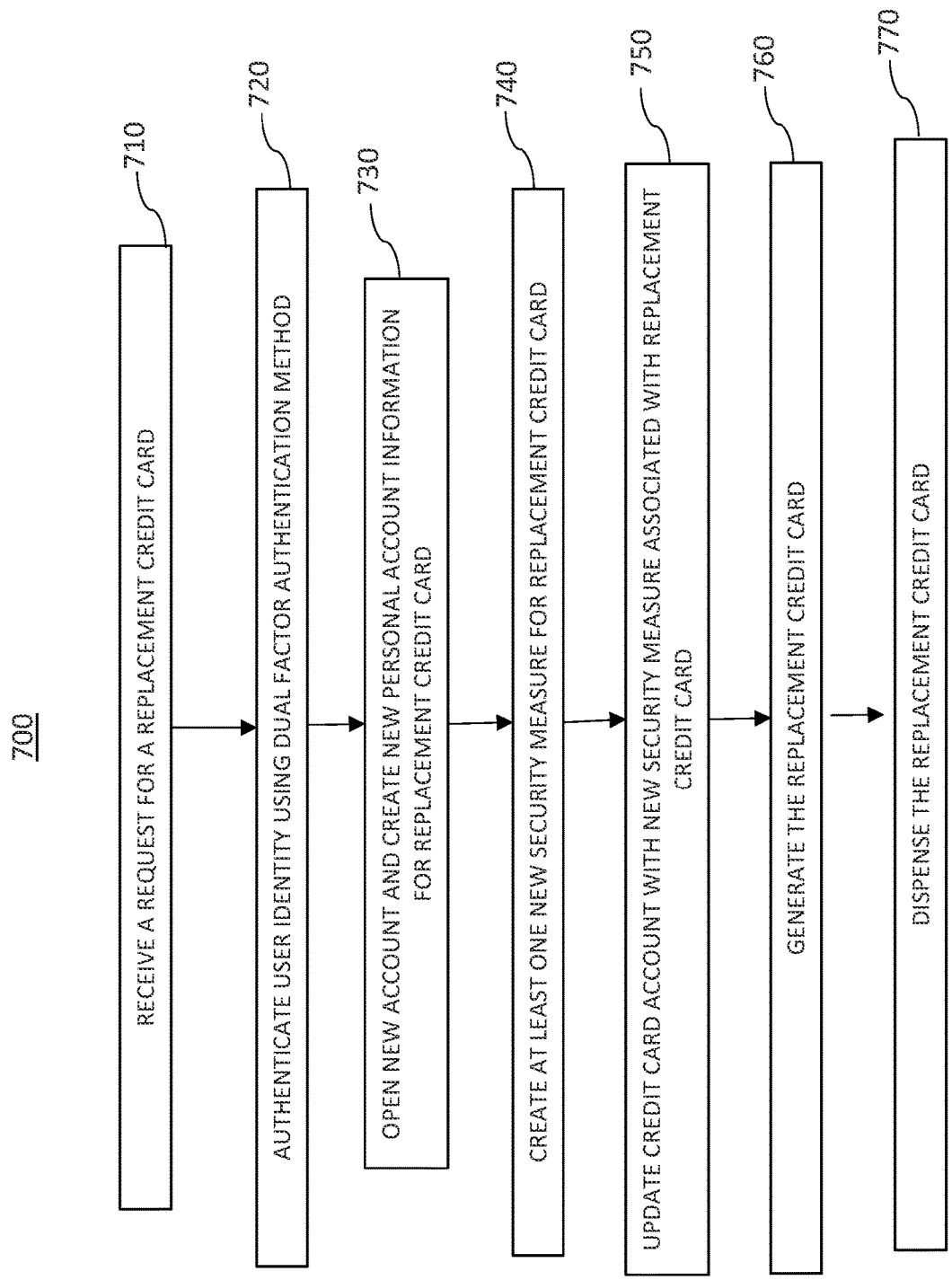
FIG. 7 is a process flow diagram illustrating another example of a computer-based process for requesting and receiving a replacement physical access instrument by interaction with the physical access instrument generation module, according to one or more embodiments of the present disclosure.

FIG. 7 is a process flow diagram illustration of an example of an illustrated computer-mediated process for requesting and receiving a replacement credit card by interaction with the ATM 200, according to one or more embodiments of the present disclosure. The exemplary computer-mediated process 700 may be executed by software, hardware, or a combination thereof. For example, process 700 may be performed by including one or more components described in the system 100 of FIG. 1 (e.g., server 400, user device 300 and ATM 200).

At step 710, the ATM 200 receives a request from the user 106, through the user interface 202, for a replacement credit card to be issued by the card issuer's computer system/device 108. In some embodiments, the ATM 200 may be configured to provide an option for requesting a replacement credit card at an initial log-in screen of the user interface 202. For example, the ATM 200 may provide a log-in screen on user interface 202 with an option to "Request a Replacement Credit Card" without requiring the user 106 to insert a second physical access instrument (i.e., debit card or credit card associated with the same card issuer's computer system/device 108) into the ATM 200. In other embodiments, the ATM 200 may include a button or other physical component which may be actuated to request a replacement credit card. In other embodiments, user 106 may request a replacement credit card after inserting the second physical access instrument 144 into the ATM 200. The second physical access instrument 144 may include a physical card or a "virtual card" stored on the user's mobile phone or tablet, e.g., on the user device 300. In some embodiments, introducing the second physical access instrument 144 to the ATM 200 may include inserting a physical card into the ATM 200 or using a contactless method such as, for example, radio frequency identification (RFID) or near-field communication (NFC).

At step 720, in response to the request for a replacement credit card, the identity of the user 106 is authenticated via the ATM 200. In some embodiments, at least one security challenge may be generated to identify and authenticate the user 106. In some embodiments, the identity of the user may be authenticated via a dual factor authentication using a PIN and cryptogram associated with a second physical access instrument 144, as previously described with regard to method 600 and FIG. 6.

In some embodiments, once the identity of the user 106 is authenticated, the user 106 may have access to all of their financial accounts associated with the card issuer's computer system/device 108. For example, in some embodiments, the user 106 may hold a bank account and two credit card accounts with the card issuer's computer system/device 108. Thus, in some embodiments, introducing the second physical access instrument 144 to the ATM 200 may give the user 106 access to each of the bank account and the two credit card accounts. In some embodiments, the user interface 202 may display each existing account held by the user 106 and present an option to select one of the accounts.

At step 730, the communications module 114 communicates with the card issuer to inform the issuer that the user 106 has requested a replacement credit card. The communications module 114 requests that the card issuer's computer system/device 108 open a new account for the user 106 and requests authorization to generate a replacement credit card for the user 106 on behalf of the card issuer's computer system/device 108. Once authorization is granted by the card issuer's computer system/device 108, the communications module 114 receives, from the new PAN creation module 150, the new personal account information including, for example, the new PAN associated with the credit card account of the user 106, expiration date of the new account, activation information, etc. In some embodiments, the system 100 updates the user's credit card account to include the new personal account information.

At step 740, the security measure determination module 160 receives the user's updated information, including the new PAN, from the new PAN creation module 150. In some embodiments, the security measure determination module 160 determines and appends at least one new security measure for the PAN. In some embodiments, the at least one new security measure is different from the security measure associated with the lost/damaged/stolen credit card. In some embodiments, the security measures may include, for example, a CVV/CVC 1 and CVV/CVC 2, a PIN, an EMV chip, Magnetic Stripe, etc., or any suitable combination thereof. In some embodiments, the security measure determination module 160 determines an appropriate BIN/sub-BIN for the temporary card and any cryptographic keys associated with the security measures and/or selected BINs.

At step 750, the system 100 updates the user's credit card account with the new security measure associated with the replacement credit card 104.

At step 760, the system 100 instructs the ATM 200 to generate and dispense the replacement credit card 104 for dispensation to the user 106. In some embodiments, the system 100 transmits the user's updated credit card account information to the ATM 200 so that the physical replacement credit card 104 bearing the new PAN, the determined security measures, and information pertaining to the user 106 (e.g., name) may be created by the ATM 200. In some embodiments, the replacement credit card 104 may be personalized by the user 106. For example, in some embodiments, the user 106 may choose a color, design, etc. to be printed onto the replacement credit card 104.

At step 770, the ATM 200 dispenses the replacement credit card 104 to the user 106.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

Figure 8:
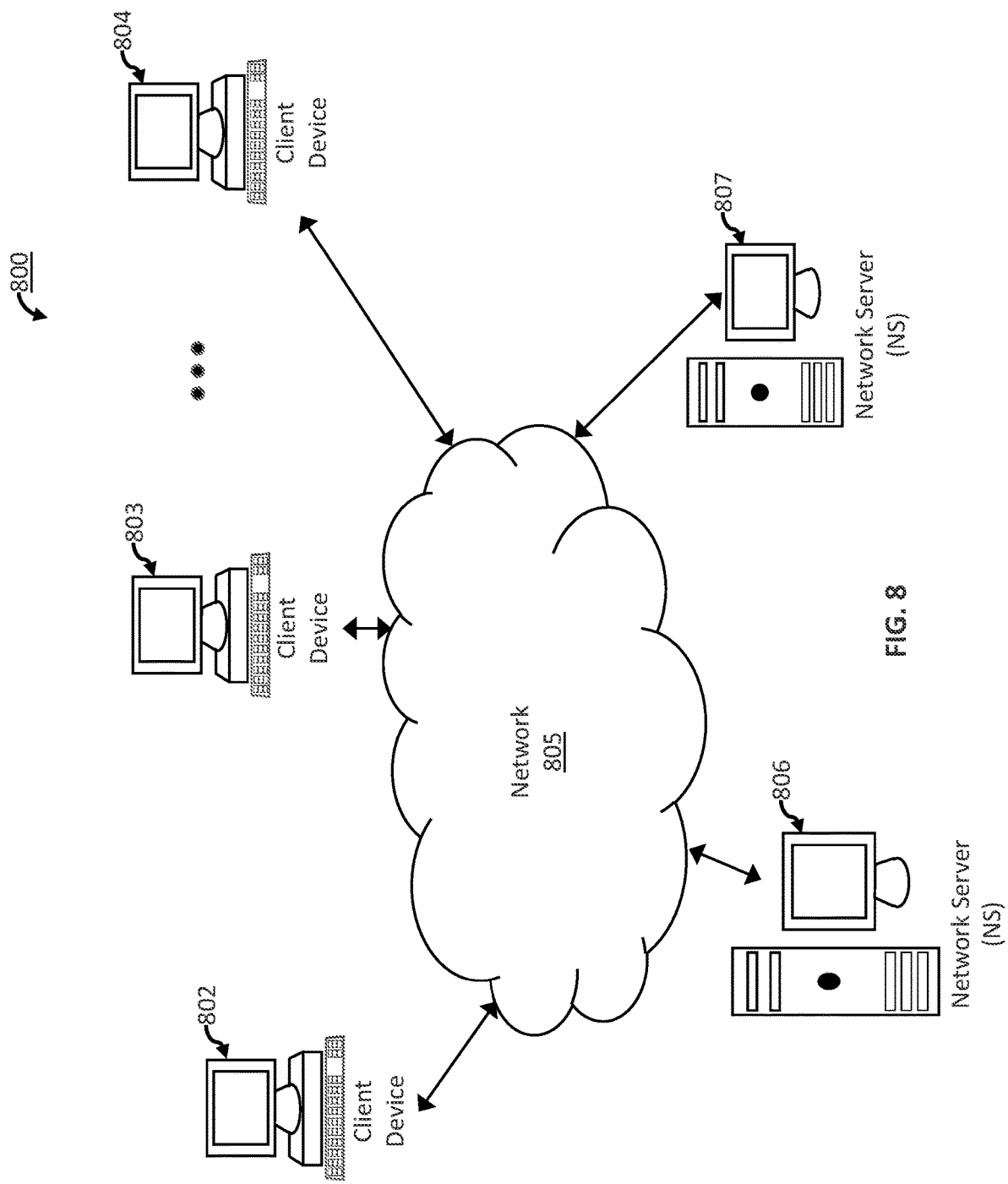
FIG. 8 is a block diagram illustrating an exemplary computer-based system and platform, according to one or more embodiments of the present disclosure.

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS)

servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
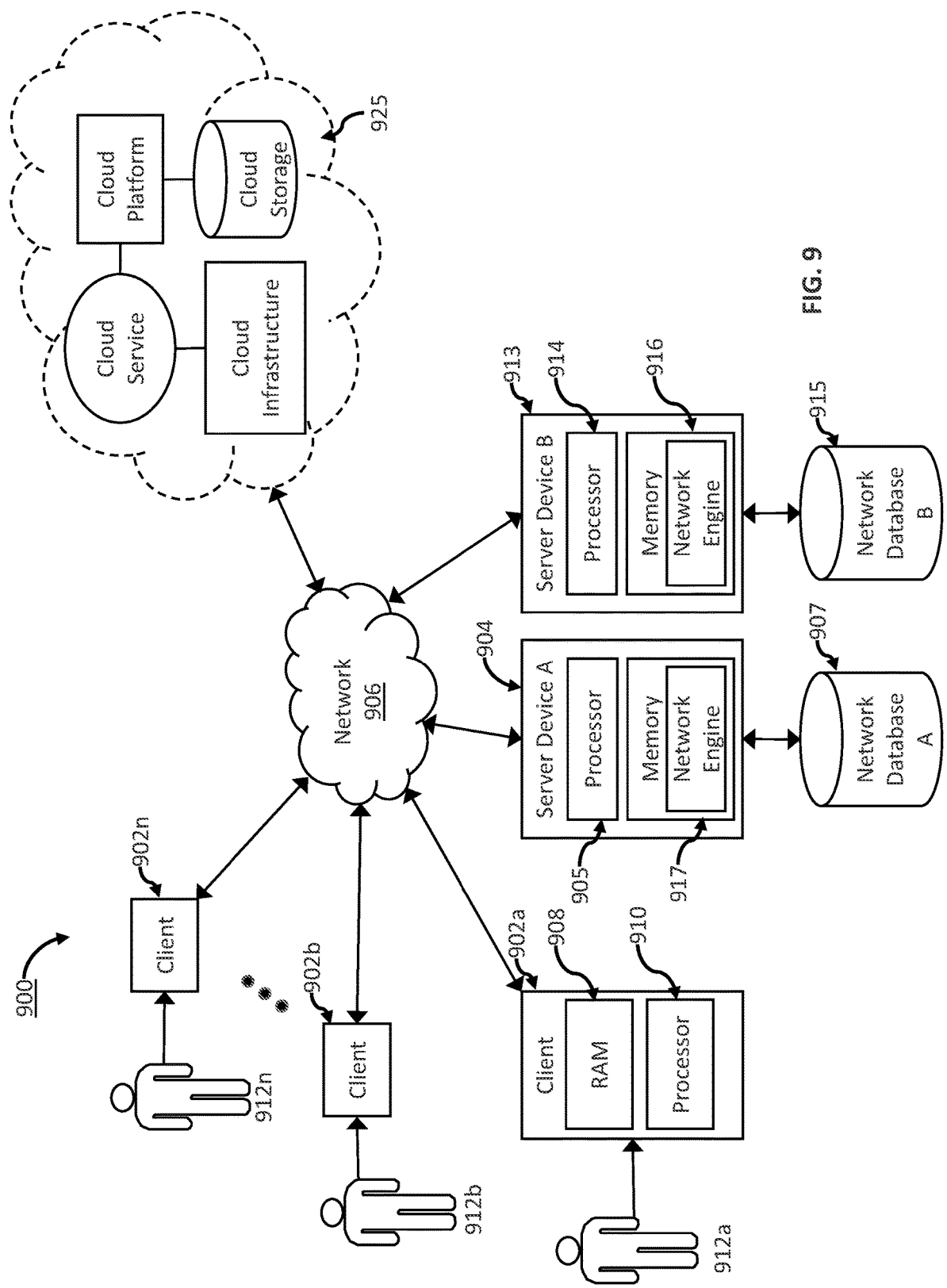
FIG. 9 is a block diagram illustrating another exemplary computer-based system and platform, according to one or more embodiments of the present disclosure.

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 902a, member computing device 902b through member computing device 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 902a through 902n may also include a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™ Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, user 912a, user 912b through user 912n, may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
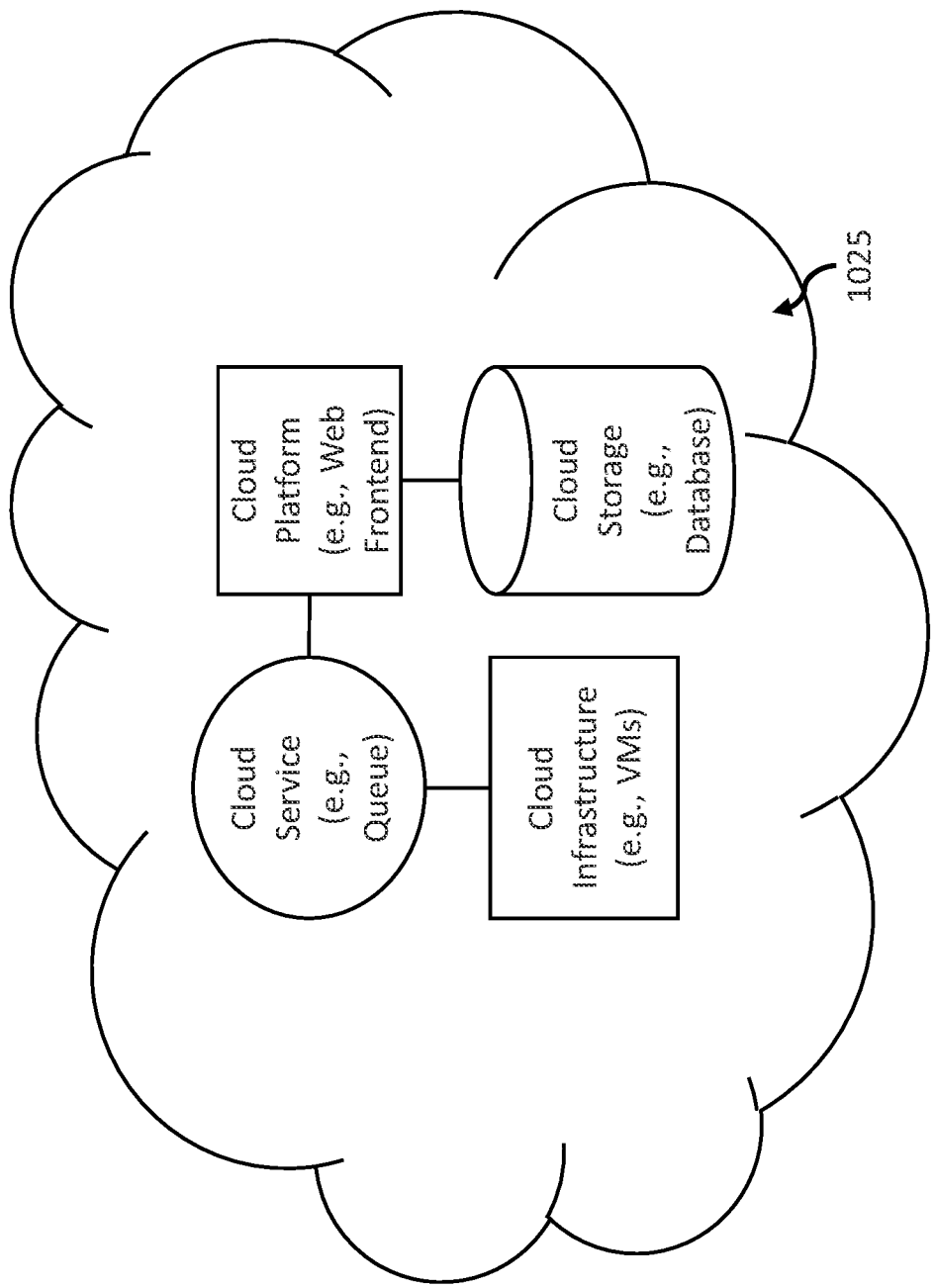
FIG. 10 is a schematic illustration of an exemplary implementation of a cloud computing/architecture(s) in which the exemplary inventive computer-based system and platform of the present disclosure may be specifically configured to operate, according to one or more embodiments of the present disclosure.
Figure 11:
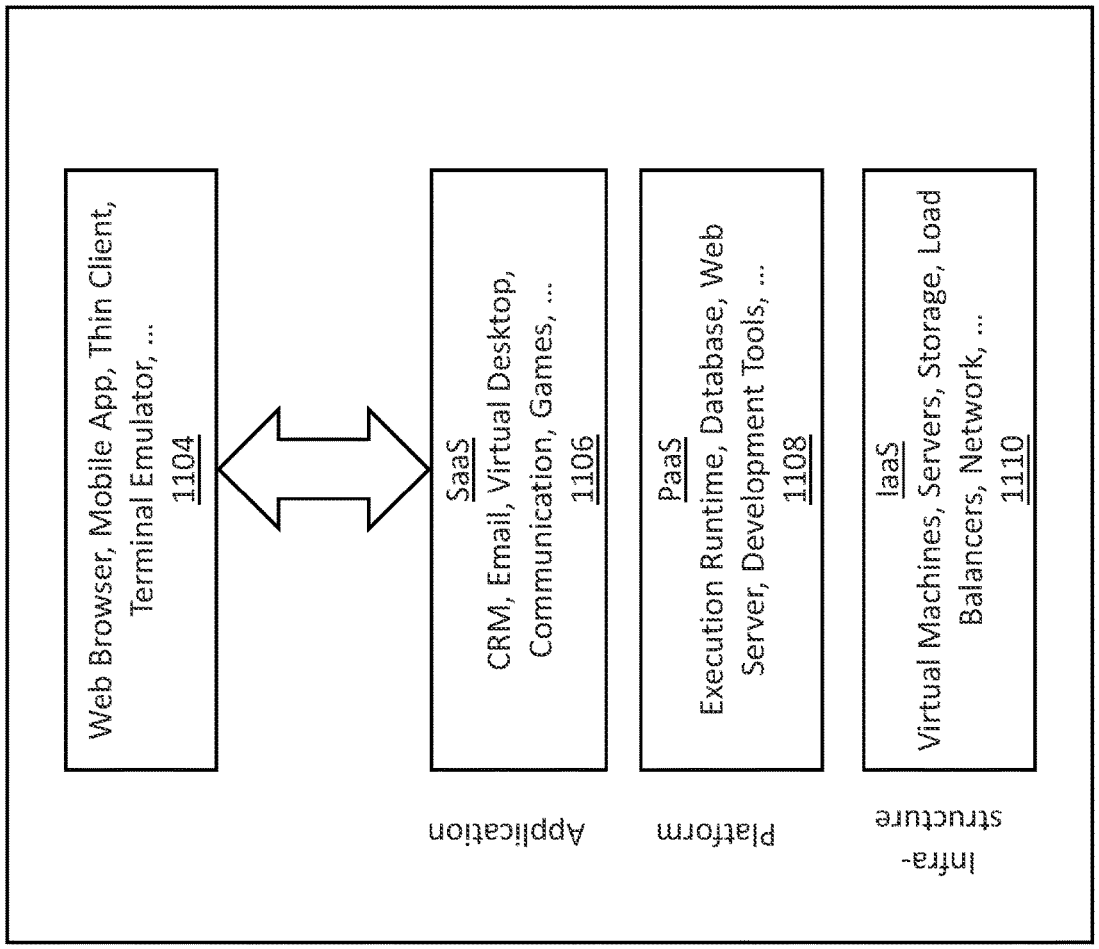
FIG. 11 is another schematic illustration of an exemplary implementation of a cloud computing/architecture(s) in which the exemplary inventive computer-based system and platform of the present disclosure may be specifically configured to operate, according to one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

A method, including:
receiving, by at least one processor, an activity data associated with a user;
where the activity data includes at least two user activity profiles;
where a first user activity profile of the at least two user activity profiles is associated with:
a) a first profile identifier, and
b) a first physical access instrument,
where the first physical access instrument includes a first security measure;
receiving, by the at least one processor, a user request, via a graphical user interface, to replace the first physical access instrument;
receiving, by the at least one processor, in response to the user request to replace the first physical access instrument, an authentication request to authenticate an identity of the user;
generating, by the at least one processor, at least one security challenge to identify the user;
where the at least one security challenge is based at least in part on a second user activity profile of the at least two user activity profiles;
establishing, by the at least one processor, a communication link with a physical access instrument generation module;
utilizing, by the at least one processor, the communication link to instruct the physical access instrument generation module, to display the authentication request to the user;
receiving, by the at least one processor, at least one security response to the at least one security challenge from the physical access instrument generation module;
where the at least one security response includes a second profile identifier associated with a second physical access instrument;
authenticating, by the at least one processor, the user based on the at least one security response;
generating, by the at least one processor, a third profile identifier to replace the first profile identifier;
updating, by the at least one processor, the activity data to include the third profile identifier;
instructing, by the at least one processor, the physical access instrument generation module to generate and dispense a third physical access instrument associated with the first user activity profile;
where the third physical access instrument includes:
a) the third profile identifier, and
b) a second security measure that is different from the first security measure;
where the physical access instrument generation module includes a plurality of blank physical access instruments.

2. The method of clause 1, further including:
prompting, by the at least one processor, the user to input a personal identification number (PIN) to receive an inputted PIN that is expected to be associated with the second physical access instrument into the physical access instrument generation module; and
forwarding, by the at least one processor, the inputted PIN to the second physical access instrument;
authenticating, by the at least one processor, an identity of the user based on the input PIN and a stored PIN that is associated with the second physical access instrument in a computer memory.

3. The method of clause 2, where the at least two user activity profiles are at least two user activity accounts;
where the first user activity profile is a first user activity account;
where the first profile identifier is a first account identifier;
where the second user activity profile is a second user activity account;
where the second profile identifier is a second account identifier; and
where the third profile identifier is a third account identifier.

4. The method of clause 3, further including:
prompting, by the at least one processor, the user to bring the second physical access instrument in communication range with the physical access instrument generation module;
where the second physical access instrument and the physical access instrument generation module each include at least one of near-field communication or radio frequency identification,
generating, by the at least one processor, a first cryptogram based on the second physical access instrument;
transmitting, by the at least one processor, the first cryptogram to the physical access instrument generation module;
generating, by the at least one processor, a second cryptogram;

determining, by the at least one processor, if the first cryptogram matches the second cryptogram; and authorizing, by the at least one processor, the user request to access the at least two user activity accounts if a match is determined between the first cryptogram and the second cryptogram.

5. The method of clause 3, where the first account identifier includes a first personal account number (PAN);

where the second account identifier includes a second PAN; and where the third account identifier includes a third PAN.

6. The method of clause 3, further including:

receiving, by the at least one processor, a user selection of the first user activity account for which the user requests to replace the first physical access instrument, via the second physical access instrument generation module.

7. The method of clause 3, where the physical access instrument generation module is an automated teller machine.

8. The method of clause 3, where the first physical access instrument is a first credit card;

where the second physical access instrument is a second credit card; and where the third physical access instrument is a third credit card.

9. A method, including:

receiving, by at least one processor, an activity data associated with a user;

where the activity data includes at least two user activity profiles;

receiving, by the at least one processor, a user request, via physical access instrument generation module, to access the at least two user activity profiles;

receiving, by the at least one processor, in response to the user request to access the at least two user activity profiles, an authentication request to authenticate an identity of the user;

generating, by the at least one processor, at least one security challenge to identify the user;

where in the at least one security challenge is based at least in part on a first user activity profile of the at least two user activity profiles;

establishing, by the at least one processor, a communication link with a mobile device of the user;

utilizing, by the at least one processor, the communication link to instruct an application, executed on the mobile device of the user, to display the authentication request to the user;

receiving, by the at least one processor, at least one security response to the at least one security challenge from the mobile device;

where the at least one security response includes a first profile identifier associated with the first physical access instrument;

authenticating, by the at least one processor, the user based on the at least one security response;

authorizing, by the at least one processor, user access to the at least two user activity profiles;

receiving, by the at least one processor, a user selection of a second user activity profile of the at least two user activity profiles;

where the second user activity profile of the at least two user activity profiles is associated with:

a) a second profile identifier, and b) a second physical access instrument, where the second physical access instrument includes a first security measure;

receiving, by the at least one processor, a user request, via a graphical user interface, to replace the second physical access instrument;

generating, by the at least one processor, a third profile identifier to replace the second profile identifier;

updating, by the at least one processor, the activity data to include the third profile identifier;

instructing, by the at least one processor, a physical access instruments generation module to generate and dispense a third physical access instrument associated with the second user activity profile;

where the third physical access instrument includes:

a) the third profile identifier, and b) a second security measure that is different from the first security measure;

where the physical access instruments generation module includes a plurality of blank physical access instruments.

10. The method of clause 9, further including:

prompting, by the at least one processor, the user to input a personal identification number (PIN) associated with the first physical access instrument into the physical access instrument generation module; and forwarding, by the at least one processor, the input PIN to the first physical access instrument;

comparing, by the at least one processor, the input PIN against a stored PIN of the first physical access instrument to authenticate an identity of the user.

11. The method of clause 10, where the at least two user activity profiles are at least two user activity accounts;

where the first user activity profile is a first user activity account;

where the first profile identifier is a first account identifier;

where the second user activity profile is a second user activity account;

where the second profile identifier is a second account identifier; and where the third profile identifier is a third account identifier.

12. The method of clause 11, further including:

prompting, by the at least one processor, the user to bring the first physical access instrument in communication range with the physical access instrument generation module;

where the first physical access device and the physical access instrument generation module each include at least one of near-field communication or radio frequency identification;

generating, by the at least one processor, a first cryptogram based on the first physical access instrument;

transmitting, by the at least one processor, the first cryptogram to the physical access instrument generation module;

generating, by the at least one processor, a second cryptogram;

determining, by the at least one processor, if the first cryptogram matches the second cryptogram; and authorizing, by the at least one processor, the user request to access the at least two user activity profiles if a match is determined between the first cryptogram and the second cryptogram.

13. The method of clause 11, where the first profile identifier includes a first personal profile number (PAN);

where the second profile identifier includes a second PAN; and where the third profile identifier includes a third PAN.

14. The method of clause 11, further including:
receiving, by the at least one processor, a user selection of the second user activity profile for which the user requests to replace the second physical access instrument, via the second physical access instrument generation module.

15. The method of clause 11, where the physical access instrument generation module is an automated teller machine.

16. The method of clause 11, where the first physical access instrument is a first credit card;
where the second physical access instrument is a second credit card; and
where the third physical access instrument is a third credit card.

17. A system, including:
at least one processor configured to execute software instructions, where the software instructions, when executed, cause the at least one processor to perform steps to:
receive an activity data associated with a user;
where the activity data includes at least two user activity profiles;
where a first user activity profile of the at least two user activity profiles is associated with:
a) a first profile identifier, and
b) a first physical access instrument,
where the first physical access instrument includes a first security measure;
receive a user request, via a graphical user interface, to replace the first physical access instrument;
receive in response to the user request to replace the first physical access instrument, an authentication request to authenticate an identity of the user;
generate at least one security challenge to identify the user;
where in the at least one security challenge is based at least in part on a second user activity profile of the at least two user activity profiles;
establish a communication link with a physical access instrument generation module;
utilize the communication link to instruct the physical access instrument generation module to display the authentication request to the user;
receive at least one security response to the at least one security challenge from the a physical access instrument generation module;
where the at least one security response includes a second profile identifier associated with a second physical access instrument;
authenticate the user based on the at least one security response;
generate a third profile identifier to replace the first profile identifier;
update the activity data to include the third profile identifier;
instruct a physical access instrument generation module to generate and dispense a third physical access instrument associated with the first user activity profile;
where the third physical access instrument includes:
a) the third profile identifier, and
b) a second security measure that is different from the first security measure;
where the physical access instrument generation module includes a plurality of blank physical access instruments.

18. The system of clause 17, where the at least two user activity profiles are at least two user activity accounts;
where the first user activity profile is a first user activity account;
where the first profile identifier is a first account identifier;
where the second user activity profile is a second user activity account;
where the second profile identifier is a second account identifier; and
where the third profile identifier is a third account identifier.

19. The system of clause 17, where the first physical access instrument is a first credit card;
where the second physical access instrument is a second credit card;
where the third physical access instrument is a third credit card.

20. The system of clause 17, where the software instructions, when executed, further cause the at least one processor to perform steps to:
prompt the user to input a personal identification number (PIN) associated with the first physical access instrument into the physical access instrument generation module; and
forward the input PIN to the first physical access instrument;
compare the input PIN against a stored PIN of the first physical access instrument to authenticate an identity of the user.

What is claimed is:

1. A method, comprising:
receiving, by at least one processor, an activity data associated with a user;
wherein the activity data comprises at least two user activity profiles;
wherein a first user activity profile of the at least two user activity profiles is associated with:
a) a first profile identifier, and
b) a first physical access instrument,
wherein the first physical access instrument comprises a first security measure;
receiving, by the at least one processor, a user request, via a graphical user interface, to replace the first physical access instrument;
receiving, by the at least one processor, in response to the user request to replace the first physical access instrument, an authentication request to authenticate an identity of the user;
generating, by the at least one processor, at least one security challenge to identify the user;
wherein in the at least one security challenge is based at least in part on a second user activity profile of the at least two user activity profiles;
establishing, by the at least one processor, a communication link with a physical access instrument generation module;
utilizing, by the at least one processor, the communication link to instruct the physical access instrument generation module, to display the authentication request to the user;
receiving, by the at least one processor, at least one security response to the at least one security challenge from the physical access instrument generation module;

wherein the at least one security response comprises a second profile identifier associated with a second physical access instrument;
authenticating, by the at least one processor, the user based on the at least one security response;
generating, by the at least one processor, a third profile identifier to replace the first profile identifier;
updating, by the at least one processor, the activity data to include the third profile identifier;
instructing, by the at least one processor, the physical access instrument generation module to generate and dispense a third physical access instrument associated with the first user activity profile;
wherein the third physical access instrument includes:
a) the third profile identifier, and
b) a second security measure that is different from the first security measure;
wherein the physical access instrument generation module comprises a plurality of blank physical access instruments.

2. The method of claim 1, further comprising:
prompting, by the at least one processor, the user to input a personal identification number (PIN) to receive an inputted PIN that is expected to be associated with the second physical access instrument into the physical access instrument generation module; and
forwarding, by the at least one processor, the inputted PIN to the second physical access instrument;
authenticating, by the at least one processor, an identity of the user based on the input PIN and a stored PIN that is associated with the second physical access instrument in a computer memory.

3. The method of claim 2, wherein the at least two user activity profiles are at least two user activity accounts;
wherein the first user activity profile is a first user activity account;
wherein the first profile identifier is a first account identifier;
wherein the second user activity profile is a second user activity account;
wherein the second profile identifier is a second account identifier; and
wherein the third profile identifier is a third account identifier.

4. The method of claim 3, further comprising:
prompting, by the at least one processor, the user to bring the second physical access instrument in communication range with the physical access instrument generation module;
wherein the second physical access instrument and the physical access instrument generation module each comprise at least one of near-field communication or radio frequency identification,
generating, by the at least one processor, a first cryptogram based on the second physical access instrument;
transmitting, by the at least one processor, the first cryptogram to the physical access instrument generation module;
generating, by the at least one processor, a second cryptogram;
determining, by the at least one processor, if the first cryptogram matches the second cryptogram; and
authorizing, by the at least one processor, the user request to access the at least two user activity accounts if a match is determined between the first cryptogram and the second cryptogram.

5. The method of claim 3, wherein the first account identifier comprises a first personal account number (PAN);
wherein the second account identifier comprises a second PAN; and
wherein the third account identifier comprises a third PAN.

6. The method of claim 3, further comprising:
receiving, by the at least one processor, a user selection of the first user activity account for which the user requests to replace the first physical access instrument, via the second physical access instrument generation module.

7. The method of claim 3, wherein the physical access instrument generation module is an automated teller machine.

8. The method of claim 3, wherein the first physical access instrument is a first credit card;
wherein the second physical access instrument is a second credit card; and
wherein the third physical access instrument is a third credit card.

9. A method, comprising:
receiving, by at least one processor, an activity data associated with a user;
wherein the activity data comprises at least two user activity profiles;
receiving, by the at least one processor, a user request, via physical access instrument generation module, to access the at least two user activity profiles;
receiving, by the at least one processor, in response to the user request to access the at least two user activity profiles, an authentication request to authenticate an identity of the user;
generating, by the at least one processor, at least one security challenge to identify the user;
wherein in the at least one security challenge is based at least in part on a first user activity profile of the at least two user activity profiles;
establishing, by the at least one processor, a communication link with a mobile device of the user;
utilizing, by the at least one processor, the communication link to instruct an application, executed on the mobile device of the user, to display the authentication request to the user;
receiving, by the at least one processor, at least one security response to the at least one security challenge from the mobile device;
wherein the at least one security response comprises a first profile identifier associated with the first physical access instrument;
authenticating, by the at least one processor, the user based on the at least one security response;
authorizing, by the at least one processor, user access to the at least two user activity profiles;
receiving, by the at least one processor, a user selection of a second user activity profile of the at least two user activity profiles;
wherein the second user activity profile of the at least two user activity profiles is associated with:
a) a second profile identifier, and
b) a second physical access instrument,
wherein the second physical access instrument comprises a first security measure;
receiving, by the at least one processor, a user request, via a graphical user interface, to replace the second physical access instrument;

generating, by the at least one processor, a third profile identifier to replace the second profile identifier;

updating, by the at least one processor, the activity data to include the third profile identifier;

instructing, by the at least one processor, a physical access instruments generation module to generate and dispense a third physical access instrument associated with the second user activity profile;

wherein the third physical access instrument includes:
a) the third profile identifier, and
b) a second security measure that is different from the first security measure;

wherein the physical access instruments generation module comprises a plurality of blank physical access instruments.

10. The method of claim 9, further comprising:

prompting, by the at least one processor, the user to input a personal identification number (PIN) associated with the first physical access instrument into the physical access instrument generation module; and forwarding, by the at least one processor, the input PIN to the first physical access instrument;

comparing, by the at least one processor, the input PIN against a stored PIN of the first physical access instrument to authenticate an identity of the user.

11. The method of claim 10, wherein the at least two user activity profiles are at least two user activity accounts;

wherein the first user activity profile is a first user activity account;

wherein the first profile identifier is a first account identifier;

wherein the second user activity profile is a second user activity account;

wherein the second profile identifier is a second account identifier; and wherein the third profile identifier is a third account identifier.

12. The method of claim 11, further comprising:

prompting, by the at least one processor, the user to bring the first physical access instrument in communication range with the physical access instrument generation module;

wherein the first physical access device and the physical access instrument generation module each comprise at least one of near-field communication or radio frequency identification;

generating, by the at least one processor, a first cryptogram based on the first physical access instrument;

transmitting, by the at least one processor, the first cryptogram to the physical access instrument generation module;

generating, by the at least one processor, a second cryptogram;

determining, by the at least one processor, if the first cryptogram matches the second cryptogram; and authorizing, by the at least one processor, the user request to access the at least two user activity profiles if a match is determined between the first cryptogram and the second cryptogram.

13. The method of claim 11, wherein the first profile identifier comprises a first personal profile number (PAN);

wherein the second profile identifier comprises a second PAN; and wherein the third profile identifier comprises a third PAN.

14. The method of claim 11, further comprising:

receiving, by the at least one processor, a user selection of the second user activity profile for which the user requests to replace the second physical access instrument, via the second physical access instrument generation module.

15. The method of claim 11, wherein the physical access instrument generation module is an automated teller machine.

16. The method of claim 11, wherein the first physical access instrument is a first credit card;

wherein the second physical access instrument is a second credit card; and wherein the third physical access instrument is a third credit card.

17. A system, comprising:

at least one processor configured to execute software instructions, wherein the software instructions, when executed, cause the at least one processor to perform steps to:

receive an activity data associated with a user;

wherein the activity data comprises at least two user activity profiles;

wherein a first user activity profile of the at least two user activity profiles is associated with:

a) a first profile identifier, and b) a first physical access instrument, wherein the first physical access instrument comprises a first security measure;

receive a user request, via a graphical user interface, to replace the first physical access instrument;

receive in response to the user request to replace the first physical access instrument, an authentication request to authenticate an identity of the user;

generate at least one security challenge to identify the user;

wherein in the at least one security challenge is based at least in part on a second user activity profile of the at least two user activity profiles;

establish a communication link with a physical access instrument generation module;

utilize the communication link to instruct the physical access instrument generation module to display the authentication request to the user;

receive at least one security response to the at least one security challenge from the physical access instrument generation module;

wherein the at least one security response comprises a second profile identifier associated with a second physical access instrument;

authenticate the user based on the at least one security response;

generate a third profile identifier to replace the first profile identifier;

update the activity data to include the third profile identifier;

instruct a physical access instrument generation module to generate and dispense a third physical access instrument associated with the first user activity profile;

wherein the third physical access instrument includes: a) the third profile identifier, and b) a second security measure that is different from the first security measure;

wherein the physical access instrument generation module comprises a plurality of blank physical access instruments.

18. The system of claim 17, wherein the at least two user activity profiles are at least two user activity accounts;

wherein the first user activity profile is a first user activity account;

wherein the first profile identifier is a first account identifier;

wherein the second user activity profile is a second user activity account;

wherein the second profile identifier is a second account identifier; and wherein the third profile identifier is a third account identifier.

19. The system of claim 17, wherein the first physical access instrument is a first credit card;

wherein the second physical access instrument is a second credit card;

wherein the third physical access instrument is a third credit card.

20. The system of claim 17, wherein the software instructions, when executed, further cause the at least one processor to perform steps to:

prompt the user to input a personal identification number (PIN) associated with the first physical access instrument into the physical access instrument generation module; and forward the input PIN to the first physical access instrument;

compare the input PIN against a stored PIN of the first physical access instrument to authenticate an identity of the user.

* * * * *